US008443684B2

(12) United States Patent
Thorwart et al.

(10) Patent No.: US 8,443,684 B2
(45) Date of Patent: May 21, 2013

(54) ROTARY DRIVE DEVICE

(75) Inventors: Gerhard Thorwart, Filderstadt (DE); Rainer Armbruster, Walddorfhaslach (DE)

(73) Assignee: Festo AG & Co. KG, Esslingen (DE)

( * ) Notice: Subject to any disclaimer, the term of this patent is extended or adjusted under 35 U.S.C. 154(b) by 258 days.

(21) Appl. No.: 12/989,990

(22) PCT Filed: Feb. 17, 2010

(86) PCT No.: PCT/EP2010/000972
§ 371 (c)(1),
(2), (4) Date: Oct. 28, 2010

(87) PCT Pub. No.: WO2010/099868
PCT Pub. Date: Sep. 10, 2010

(65) Prior Publication Data

US 2011/0265585 A1 Nov. 3, 2011

(30) Foreign Application Priority Data

Mar. 4, 2009 (DE) ......................... 10 2009 011 764

(51) Int. Cl.
*F16H 37/00* (2006.01)
*F16C 33/61* (2006.01)

(52) U.S. Cl.
USPC ................... 74/11; 74/63; 384/513; 384/519; 384/615; 384/616

(58) Field of Classification Search
USPC .............. 74/11; 384/615, 513, 519, 616, 609; 415/229, 231, 170.1, 174.1; 92/121, 122
See application file for complete search history.

(56) References Cited

U.S. PATENT DOCUMENTS 2,220,027 A * 10/1940 Scott ............................ 384/615
2,781,027 A * 2/1957 Henry ............................. 92/122
2,796,776 A * 6/1957 Locke, Sr. et al. .............. 74/822
3,002,429 A * 10/1961 Braun et al. .................. 409/165
3,099,073 A * 7/1963 Olson ...................... 29/898.066
3,148,595 A * 9/1964 Looney ............................. 92/11
3,482,892 A * 12/1969 Pohler et al. .................. 384/615
3,543,367 A * 12/1970 Arnot ...................... 29/898.063
4,070,935 A * 1/1978 Caprioli .......................... 82/165
4,508,016 A * 4/1985 Weyer ............................... 92/33

(Continued)

FOREIGN PATENT DOCUMENTS

CN 1603636 4/2005
CN 1742175 3/2006

(Continued)

*Primary Examiner* — David M Fenstermacher
*Assistant Examiner* — Valentin Craciun
(74) *Attorney, Agent, or Firm* — Hoffmann & Baron, LLP

(57) ABSTRACT

The subject is a rotary drive device (1), which has a device housing (7) in which drive means (2) are disposed that are in driving communication with a rotatably supported power takeoff part (4). The power takeoff part (4) has a power takeoff disc (5) that is received at least partly in a bearing receptacle (25) of the device housing (7), the power takeoff disc being surrounded by an annular roller bearing unit (33). The roller bearing unit has a bearing assembly (34) with rolling elements (35) and with one inner and one outer running surface arrangement (37, 38), and the entire bearing assembly (34) is disposed inside the bearing receptacle (25) and is surrounded radially outward by a boundary wall portion (27) of the device housing (7).

17 Claims, 4 Drawing Sheets

U.S. PATENT DOCUMENTS 4,509,871 A * 4/1985 Herzog et al. ................ 384/502
4,688,953 A * 8/1987 Koch et al. .................... 384/615
4,696,586 A * 9/1987 Krug ............................. 384/500
4,778,287 A * 10/1988 Jacob et al. ................... 384/613
4,784,047 A * 11/1988 Stoll et al. ...................... 92/13.5
4,797,008 A * 1/1989 Helbig et al. ................... 384/49
5,493,876 A * 2/1996 Tsuchiya ............................ 66/8
5,834,662 A * 11/1998 Stoll et al. ....................... 74/425
6,003,431 A * 12/1999 Bertini .............................. 92/30
6,170,384 B1 * 1/2001 Stoll et al. ......................... 92/22
6,269,664 B1 * 8/2001 Wang .................................. 66/8
6,497,172 B2 12/2002 Hirano et al.
7,081,062 B2 7/2006 Tesar
7,739,944 B2 * 6/2010 Ante et al. ................... 92/13.41
2007/0116394 A1 * 5/2007 Hart .............................. 384/513
2009/0205486 A1 * 8/2009 Ante et al. ........................ 92/31

FOREIGN PATENT DOCUMENTS

CN 1311399 9/2011
DE 19511488 10/1996
DE 102006015478 10/2007
EP 1591194 11/2005
EP 2093432 8/2009
JP 2002130208 5/2002
JP 2007127160 5/2007
JP 2008157289 7/2008
WO WO2008075481 6/2008

* cited by examiner

ROTARY DRIVE DEVICE

This application claims priority based on an International Application filed under the Patent Cooperation Treaty, PCT/EP2010/000972, filed Feb. 17, 2010, which claims priority to DE 102009011764.4, filed Mar. 4, 2009.

BACKGROUND OF THE INVENTION

The invention relates to a rotary drive device, having a device housing in which drive means are disposed which are in rotary driving connection with a power takeoff part supported rotatably relative to the device housing, the power takeoff part having a power takeoff disc which over at least a portion of its axial length is disposed in a bearing receptacle surrounded radially outward by the device housing, and the power takeoff disc being surrounded concentrically radially outward by at least one annular roller bearing unit which has a bearing assembly, the bearing assembly comprising the following: a plurality of rolling elements distributed over the circumference of the power takeoff disc; an annular inner running surface arrangement serving to radially brace the rolling elements relative to the power takeoff disc; and an annular outer running surface arrangement serving to radially brace the rolling elements with respect to the device housing.

A rotary drive device of this type, known from Patent Abstracts of Japan for JP 2007/127160 A, includes two racks, movable in alternation back and forth, in a device housing that cooperate as drive means with a power takeoff part in order to put the power takeoff part into reciprocating rotation. The power takeoff part has a power takeoff shaft, which meshes with the racks, and a power takeoff disc, formed integrally on the face end thereof and serving to as a force pickup. For rotary support, there is a roller bearing unit, concentrically surrounding the power takeoff disc, which roller bearing unit brings about bracing relative to the device housing. The roller bearing unit includes a bearing assembly, comprising an annular inner running surface arrangement, formed integrally onto the outer circumference of the power takeoff disc; an annular outer running surface arrangement, embodied on an additional bearing ring; and a plurality of rolling elements, which are braced on the two running surface arrangements. The bearing ring is inserted into an axially open bearing receptacle of the device housing, but it protrudes to some distance out of this bearing receptacle, as does the bearing assembly.

From WO 2008/075481 A1 and from Patent Abstracts of Japan for Japanese Patent JP 2008/157289 A forming the priority basis therefor, a rotary drive device of similar construction is known, but in which the power takeoff disc is embodied in multiple parts, resulting in a subdivision into a flange portion, embodied integrally with the power takeoff shaft, and a bearing portion joined to this flange portion in a manner fixed against relative rotation. For rotary support of the power takeoff part, rolling elements are used, disposed between the bearing portion and a bearing ring disposed concentrically to it and secured to the device housing.

DE 195 11 488 C2 describes a rotary drive device, called a pivoting piston motor, whose power takeoff part is embodied in shaftlike form and can be set into rotation by a pivoting piston that can be acted upon by fluid. A power takeoff disc on which components of relatively large dimensions can be fixed is not present in this rotary drive device.

Finally, DE 10 2006 015 478 A1 describes special embodiments of a roller bearing unit in which the running surface arrangements, cooperating with the rolling elements, are embodied on relatively thin wirelike bearing rings.

The two rotary drive devices discussed first above do make it possible, on their power takeoff disc which has a relatively large diameter, to fix components of relatively large dimensions and drive them to a rotary motion. However, the problem exists of overloading the roller bearing units used for rotary support, if the components to be driven have a high weight or for other reasons act with strong forces on the power takeoff part. Above all, forces that engage at a relatively great spacing from the longitudinal axis of the power takeoff part can result in unwanted wear, because of the resultant tilting moments.

SUMMARY OF THE INVENTION

It is the object of the present invention to create a rotary drive device which is designed for heavy loads with compact dimensions.

For attaining this object, in conjunction with the characteristics recited at the outset, it is provided that the entire bearing assembly of the annular roller bearing unit is received axially inside the bearing receptacle of the device housing, in such a manner that the entire outer running surface arrangement is surrounded and braced by the boundary wall portion, delimiting the bearing receptacle radially outward, of the device housing.

In this way, the power takeoff disc continues to be braced by the roller bearing unit in the vicinity of its radially outward-oriented outer circumference, so that in this respect the prerequisites for the absorption of strong tilting forces are created. A further factor, however, is that the bearing assembly is accommodated entirely in the interior of the bearing receptacle of the device housing and is braced radially outward by the boundary wall portion demarcating the bearing receptacle. In this way, a very high tilting load capacity is achieved in conjunction with extremely compact dimensions.

Advantageous refinements of the invention will become apparent from the dependent claims.

Preferably, both the outer running surface arrangement and the inner running surface arrangement comprise a plurality, in particular two each, of axially spaced-apart wirelike bearing rings, so that the rolling elements are braced on one side by outer bearing rings and on the other by inner bearing rings. These bearing rings make an extremely compact embodiment of the roller bearing unit possible and enable a design such that forces acting both axially and radially on the power takeoff part can be reliably withstood. The conceptual structure can in particular correspond to that described in DE 10 2006 015 478 A1 already mentioned at the outset. Thus despite overall relatively small outer dimensions, a relatively large bearing diameter can be achieved.

While the optionally two outer bearing rings present are expediently braced by the boundary wall portion of the device housing, in the case of the inner bearing rings a subdivision is preferably made, such that a rear inner bearing ring is braced directly on the power takeoff disc, while a front bearing ring axially preceding it acts only indirectly on the power takeoff disc by being braced on an adjusting ring which is mounted coaxially on the power takeoff disc.

The possibility exists of embodying and disposing the adjusting ring such that by varying its axial relative position occupied with respect to the power takeoff disc, the prestressing of the bearing assembly is adjustable. In this way, calibration can be done, which makes rotary support that is play-free both axially and radially possible.

Expediently, the adjusting ring is screwed onto the power takeoff disc.

To fix the rolling elements in their position relative to one another in the circumferential direction of the power takeoff disc, the bearing assembly can have an annular bearing cage, likewise disposed entirely inside the bearing receptacle.

The rotary drive device is preferably designed for fluidic actuation. The drive means can be activated by fluid force and bring about the rotary motion of the power takeoff part about its longitudinal axis by cooperation with the power takeoff part. In principle, however, electrically activatable drive means would also be conceivable.

The boundary wall portion, radially enclosing the bearing receptacle is expediently a component made in one piece with the housing wall of the device housing, so that the external forces acting on the roller bearing unit are carried optimally away into the device housing. The housing wall expediently delimits a drive chamber that at least partly receives the drive means. In particular, it may be provided that the housing wall is subdivided into a plurality of wall elements, disposed in succession in the axial direction of the rotary axis of the power takeoff part, which jointly define at least one drive chamber, and one of which wall elements has the boundary wall portion.

In an embodiment as a rotary drive device actuatable by fluid force, the drive means can operate on the rack-and-pinion principle, for instance, or preferably can include at least one pivoting piston that can be driven by fluid action to a reciprocating pivoting motion.

Particularly for rotary drive devices of relatively small dimensions, a one-piece power takeoff disc is recommended. Preferably, with relatively large rotary drive devices, recourse is had to a two-piece power takeoff disc, which has a flange portion joined to the power takeoff shaft and a bearing portion joined, in particular detachably, to the flange portion. In that case, the roller bearing unit expediently cooperates with the bearing portion. The latter can fit from the front in hoodlike fashion over the flange portion.

BRIEF DESCRIPTION OF THE DRAWINGS

The invention will be described in further detail below in conjunction with the accompanying drawings. In the drawings.

DETAILED DESCRIPTION OF THE PREFERRED EMBODIMENTS

Figure 2:
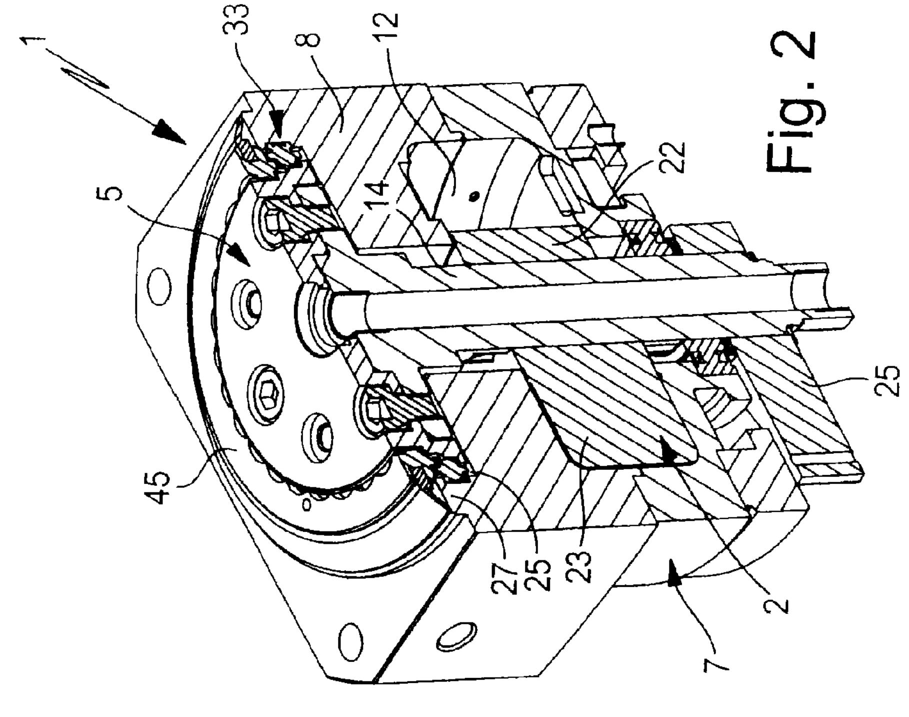
FIG. 2 is a longitudinal section taken along the line II-II through the rotary drive device of FIG. 1, in a perspective view.
Figure 1:
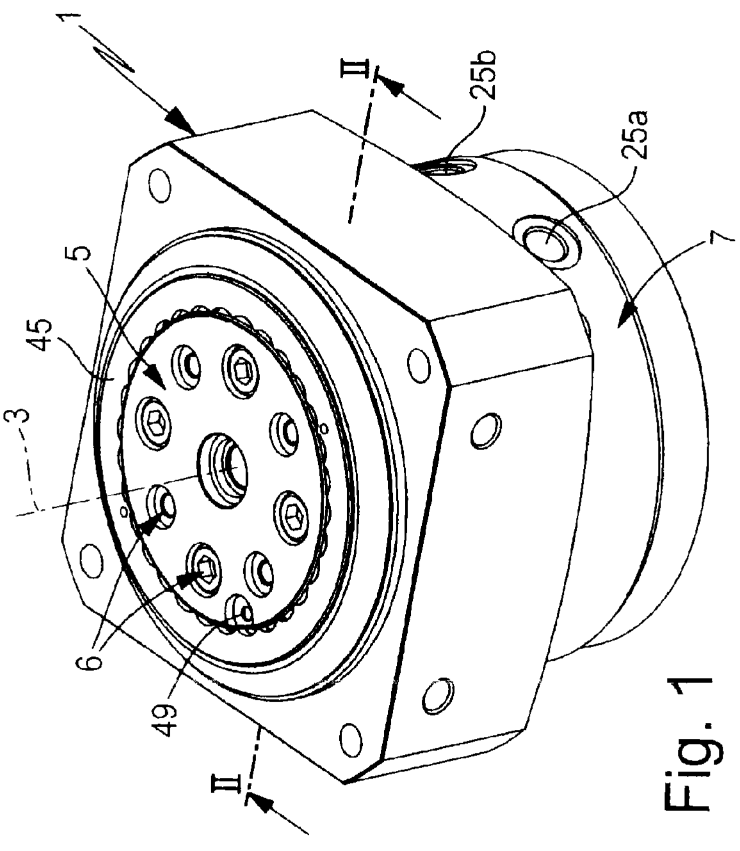
FIG. 1, in a perspective view, shows a preferred embodiment of the rotary drive device that is equipped with a two-piece power takeoff disc.

Unless otherwise indicated, the ensuing description applies to all the exemplary embodiments shown in the drawings.

The rotary drive device, identified overall by reference numeral 1, has a power takeoff part 4 that can be driven by drive means 2 to a rotary motion about a rotary axis 3. The exemplary embodiments enable the generation of an oscillating, reciprocating rotary motion, although in principle a design for generating a unidirectional rotary motion, if needed even incremental, would also be possible.

The power takeoff part 4 has a power takeoff disc 5, which is concentric with the rotary axis 3 and is preferably designed in disklike fashion and on which a component of arbitrary type, not further shown, that can be driven to execute a rotary or pivoting motion can be fixed. To make this fixation possible, the power takeoff disc 5 is equipped with a suitable fastening interface 6, which for instance comprises a plurality of fastening holes distributed in a suitable pattern.

The rotary drive device 1 has a device housing 7, which has a housing wall 8 that demarcates at least one drive chamber 12 that at least partly receives the aforementioned drive means 2. For example, the drive means 2 are accommodated in their entirety inside the drive chamber 12.

The power takeoff part 4, to enable a rotary motion, is rotatably supported on the device housing 7. With at least part of its length it plunges into the device housing 7, and it is expediently embodied such that it completely penetrates the device housing 7—as in the exemplary embodiment. In that case, the power takeoff part 4 also extends into the drive chamber 12, and for example even through the drive chamber 12, where it is in rotary driving connection in a suitable way with the drive means 2.

Preferably, the power takeoff part 4 has an elongated form and has a longitudinal axis 13, which when the rotary motion is executed forms the rotary axis 3. Expediently, the power takeoff part 4 includes a power takeoff shaft 14, which completely or partly penetrates the device housing 7 and which has the power takeoff disc 5 on one of its two end portions.

The power takeoff disc 5 is disposed in the vicinity of an outer side, hereinafter called the front side 15, of the device housing 7. A rear end portion 16, opposite from the power takeoff disc 5, of the power takeoff shaft 14 protrudes out of the device housing 7, on a back side 17 thereof opposite from the front side 15. By first and second rotary bearing means 18*a*, 18*b*, the power takeoff part 4 is rotatably supported and axially braced relative to the device housing 7; the first rotary bearing means 18*a* is disposed in the vicinity of the front side 15, and the second rotary bearing means 18*b* is disposed in the vicinity of the back side 17. While the first rotary bearing means 18*a* is disposed between the power takeoff disc 5 and the housing wall 8, the second rotary bearing means 18*b* are seated between the housing wall 8 and the power takeoff shaft 14.

By means of the first rotary bearing means 18*a*, the power takeoff part 4 is at the same time braced both radially and axially relative to the device housing 7. The second rotary bearing means 18*b* can thus be limited to radial bracing and are embodied in particular as radial roller bearing means, which concentrically surrounded the power takeoff shaft 14.

In the exemplary embodiments, the drive means 2 each include a so-called pivoting piston 22, which is penetrated in a manner fixed against relative rotation by the power takeoff shaft 14 and has at least one radially protruding pivot vane 23 in sealing contact with the boundary face of the drive chamber 12. Alternatively, the pivoting piston 22 could also be embodied in one piece with the power takeoff shaft 14.

Jointly with a space divider, not visible in the drawings, the pivoting piston 22 subdivides the drive chamber 12 into two work compartments 24*a*, 24*b*, which are each in communication with one of two control conduits 25*a*, 25*b*, which open out at an outer face of the device housing 7 and through which a controlled action on the two work compartments 24*a*, 24*b* by fluid is possible, so that the pivoting piston 22 is driven to execute a pivoting motion, from which the rotary motion of the power takeoff part 4, coupled in motion with the pivoting piston 22, results.

In an embodiment not shown, the drive means 2 include one or two racks, which mesh with a pinion connected to the power takeoff shaft 14 in a manner fixed against relative rotation and which can be driven by fluid action to a linear motion, which is converted by the meshing engagement into a rotary motion of the power takeoff part 4.

As the driving fluid for the rotary drive device 1, compressed air is used in particular, although other gaseous or liquid media are also suitable. Moreover, it would be possible to embody the drive means 2 as electrically actuatable, for instance in the form of an electric servo motor or stepping motor.

A stop element 25 which goes along with the rotary motion can be disposed on the rear end portion 16, protruding from the device housing 7, of the power takeoff shaft 14; with this stop element, the angle of rotation of the power takeoff part 4 can be mechanically limited by cooperation of the stop element with at least one counterpart stop means, not further shown, disposed on the device housing 7.

In the vicinity of its front side 15, the device housing 7 has an axially oriented recess, which will hereinafter be called a bearing receptacle 25. The bearing receptacle 25 is open toward the front side 15 of the device housing 7 and is bounded on the back side by a portion, hereinafter called the bottom wall portion 26, of the housing wall 8. An annular boundary wall portion 27 of the housing wall 8, protruding in collarlike fashion toward the front side 15 from the bottom wall portion 26, delimits the bearing receptacle 25 peripherally, that is, in the radially outer region.

The bottom wall portion 26 is provided with a central aperture 28, through which the power takeoff shaft 14 extends.

With a portion of its axial length, the power takeoff disc 5 is disposed in the bearing receptacle 25. It protrudes to some extent axially forward out of the bearing receptacle 25 and thus protrudes past the front end face 32 of the boundary wall portion 27. In a departure from this, the power takeoff disc 5 could also be accommodated sunken entirely in the bearing receptacle 25.

The aforementioned first rotary bearing means 18*a* are embodied as an annular roller bearing unit 33, which concentrically surrounds the power takeoff disc 5. The roller bearing unit 33 is braced radially inward on the power takeoff disc 5 and radially outward on the inner face of the annular boundary wall portion 27. Consequently, all the bracing occurs axially inside the bearing receptacle 25, so that the forces introduced into the power takeoff part 4 can be optimally absorbed by the device housing 7, even if they are very strong forces. Consequently, the rotary drive device 1 can be used for moving heavy loads, without being subject to particular problems of wear.

The roller bearing unit 33 has a bearing assembly 34, composed of a plurality of components. This bearing assembly 34 includes a plurality of individual rolling elements 35, which in the exemplary embodiment are formed by ball bodies but for instance may also be embodied circular-cylindrically. The rolling elements 35 are distributed successively along a circular line around the power takeoff disc 5 and are expediently kept at a predetermined spacing from one another by an annular bearing cage 36 that also belongs to the bearing assembly 34. The bearing cage 36 may for instance be a striplike element of annular shape that is perforated many times in its circumferential direction, with the perforations forming receiving seats in each of which one rolling element 35 is fixed rotationally movably.

The bearing cage 36 is optional. It can furthermore be realized by still other means as well.

Further components of the bearing assembly 34 are an annular inner running surface arrangement 37 and, with a great diameter than that running surface arrangement, an annular outer running surface arrangement 38. The rolling elements 35 rest on these running surface arrangements 37, 38 and roll on them when the power takeoff part 4 is executing its rotary motion.

Preferably, the two running surface arrangements 37, 38 each comprise at least two axially spaced-apart individual running surfaces. These individual running surfaces, viewed in cross section, are disposed in particular in the corner regions of a square, so that each rolling element 35 is braced on four circumferential portions offset from one another by 90°.

The entire bearing assembly 34 is disposed axially inside the bearing receptacle 25 and is surrounded radially on the outside entirely by the boundary wall portion 27. The consequence is in particular that the entire outer running surface arrangement 38 is surrounded and braced by the boundary wall portion 27 radially delimiting the bearing receptacle 25 on the outside.

In an especially advantageous way, the inner and outer running surface arrangements 37, 38 in the exemplary embodiment are each formed by a plurality of wirelike bearing rings 42, 43. The outer running surface arrangement 38 is embodied on two outer bearing rings 42 axially spaced apart from one another, which belong to the bearing assembly 34 and are disposed radially between the arrangement of rolling elements 35 and the annular boundary wall portion 27. The outer bearing rings 42 are accordingly each braced radially inward on the boundary wall portion 27 and each define one of two outer individual running surfaces that form the outer running surface arrangement 38.

For simple fixation of the outer bearing rings 42, an outer annular groove 44 concentric with the power takeoff disc 5 is expediently embodied in the radial inner face of the boundary wall portion 27, and the outer bearing rings 42 are received in this annular groove; one each of the outer bearing rings 42 is braced in one of the two cornerlike transition regions between the groove base and the groove sides of the annular groove 44.

The inner running surface arrangement 37 expediently also comprises two (inner) individual running surfaces, which are each defined by one of two wirelike inner bearing rings 43, which are braced, spaced apart axially, radially outward on the power takeoff disc 5. However, only the rear inner bearing ring 43*a*, located closer to the back side 17, is braced directly on the power takeoff disc 5. The front inner bearing ring 43*b*, axially preceding this rear inner bearing ring 43*a*, is conversely braced only indirectly on the power takeoff disc 5, with the interposition of an adjusting ring 45. This provision makes it possible to adjust the internal prestressing of the bearing assembly 34 and thus the bearing play of the roller bearing unit 33.

In the concrete exemplary embodiment, an adjusting ring 45 that is separate relative to the power takeoff disc 5 is screwed concentrically onto the power takeoff disc 5, for which purpose threaded means 46 in threaded engagement with one another are embodied on the outer circumference of the power takeoff disc 5 and on the inner circumference of the adjusting ring 45. By rotation relative to the power takeoff disc 5, the axial relative position of the adjusting ring 45 occupied relative to the power takeoff disc 5 can be calibrated. Since the front inner bearing ring 43*b* is braced on the adjusting ring 45, in this way the axial position of this front inner bearing ring 43*b* can also be varied.

The relative rotary position between the adjusting ring 45 and the power takeoff disc 5 can be secured by means of a securing screw 49 that can be screwed in between these two components.

The inner bearing rings 43 are expediently fixed in a comparable way to the outer bearing rings 42. In the vicinity of the outer circumference of the power takeoff disc 5, an inner annular groove 47, open radially outward and partly defined by the adjusting ring 45 and partly by the power takeoff disc 5, is embodied, in the two corner regions of which one each of the inner bearing rings 43 is braced radially and axially.

The farther the adjusting ring 45 is screwed axially onto the power takeoff disc 5, the harder the individual running surface, embodied on the front inner bearing ring 43, presses against the rolling elements 35 and tenses them in both the radial and the axial direction with all the other individual running surfaces.

The entire power takeoff part 4 is braced in the radial and axial direction and immovably fixed in this way solely by means of the roller bearing unit 33. Instead of being joined axially adjustably to the power takeoff disc 5 by means of a screw connection, the adjusting ring 45 could also be so joined by other fastening means.

To protect the roller bearing unit 33 against becoming dirty, the adjusting ring 45 expediently has a radially outward-protruding annular sealing lip 48, which goes along with the rotary motion of the power takeoff disc 5 and in the process, in sealing contact, slides along the front end face 32 of the boundary wall portion 27.

The boundary wall portion 27 is preferably a one-piece component of the housing wall 8. This ensures especially precise production and bracing.

In the exemplary embodiment, the housing wall 8, to enable installing the drive means 2 in the vicinity of the drive chamber 12, is split crosswise. In this way, the housing wall 8 is composed of two wall elements 52, 53, disposed in succession in the axial direction of the rotary axis 3 which are joined to one another by fastening elements, especially screws, not further shown. The two wall elements 52, 53 thus together define the drive chamber 12. The boundary wall portion 27 is disposed on the front one (52) of the two wall elements and in particular is embodied in one piece with it.

Figure 5:
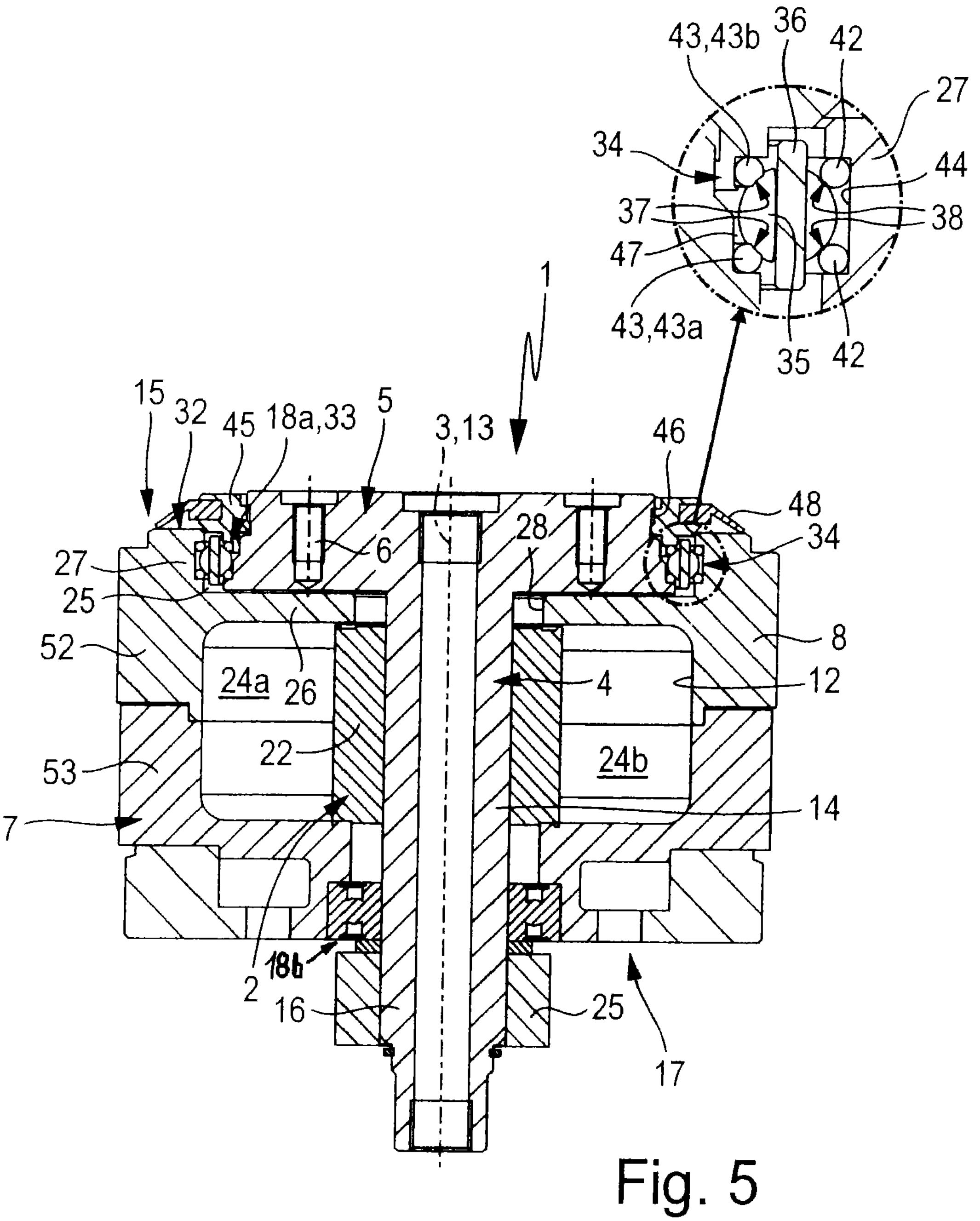
FIG. 5 is a longitudinal section, comparable to FIG. 3, through a further embodiment of the rotary drive device, equipped with a one-part power takeoff disc.

For the implementation of the power takeoff disc 5, the two exemplary embodiments provide two alternative designs. In the exemplary embodiment shown in FIG. 5, the power takeoff disc 5 is embodied in one piece and is also expediently joined integrally to the power takeoff shaft 14 by being made in one piece with it. This variant is recommended above all for rotary drive devices of relatively small structural sizes.

In the exemplary embodiment of FIGS. 1 through 4, there is a power takeoff disc 5, split into two parts, which comprises both an annular flange portion 54, in particular integrally joined in one piece to the power takeoff shaft 14, and a bearing portion 55 separate from the flange portion but joined to the flange portion 54 in a manner fixed against relative rotation.

Figure 3:
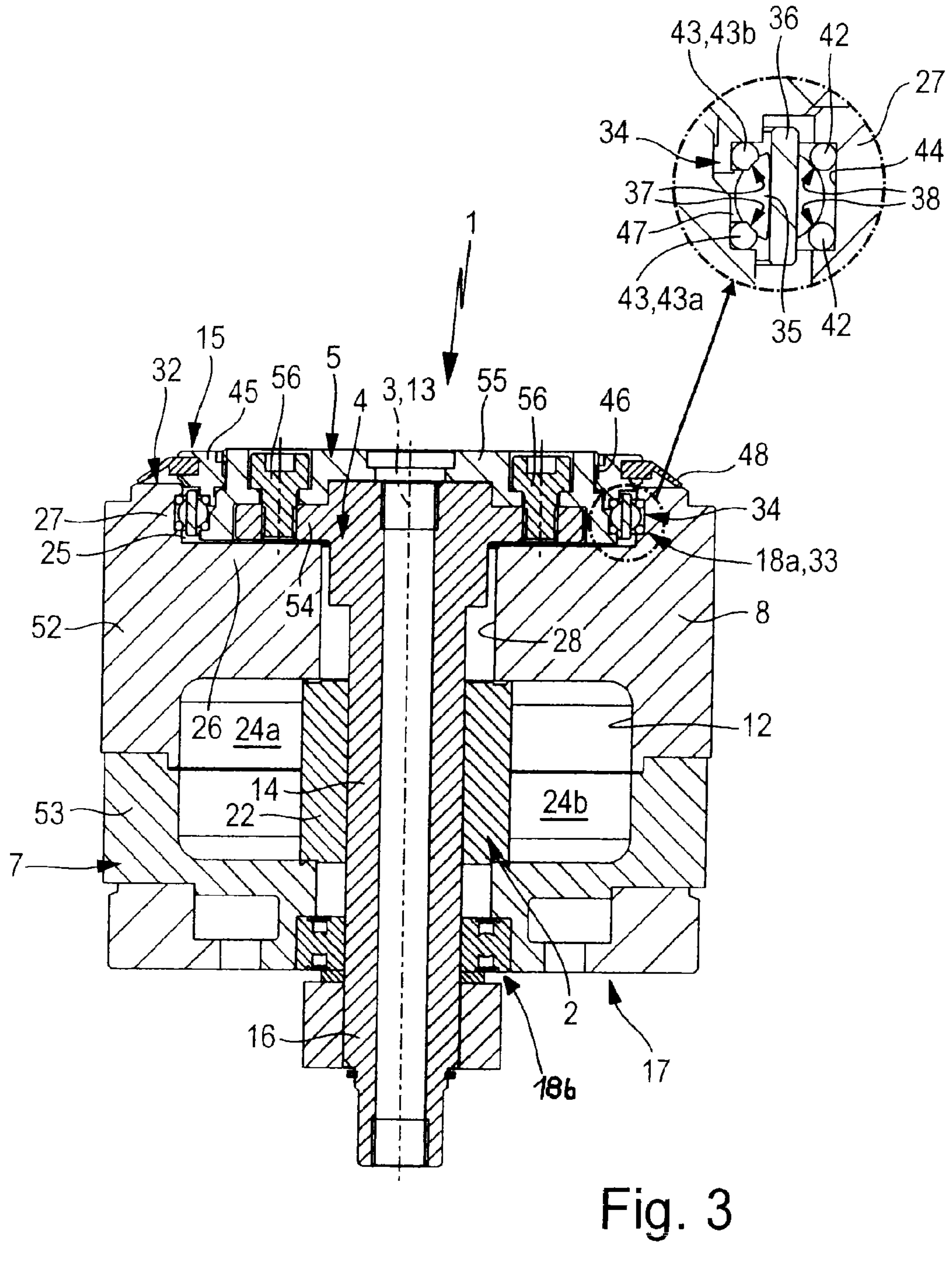
FIG. 3 is a longitudinal section through the rotary drive device of FIG. 1 in a plane offset from FIG. 2 by 90°.
Figure 4:
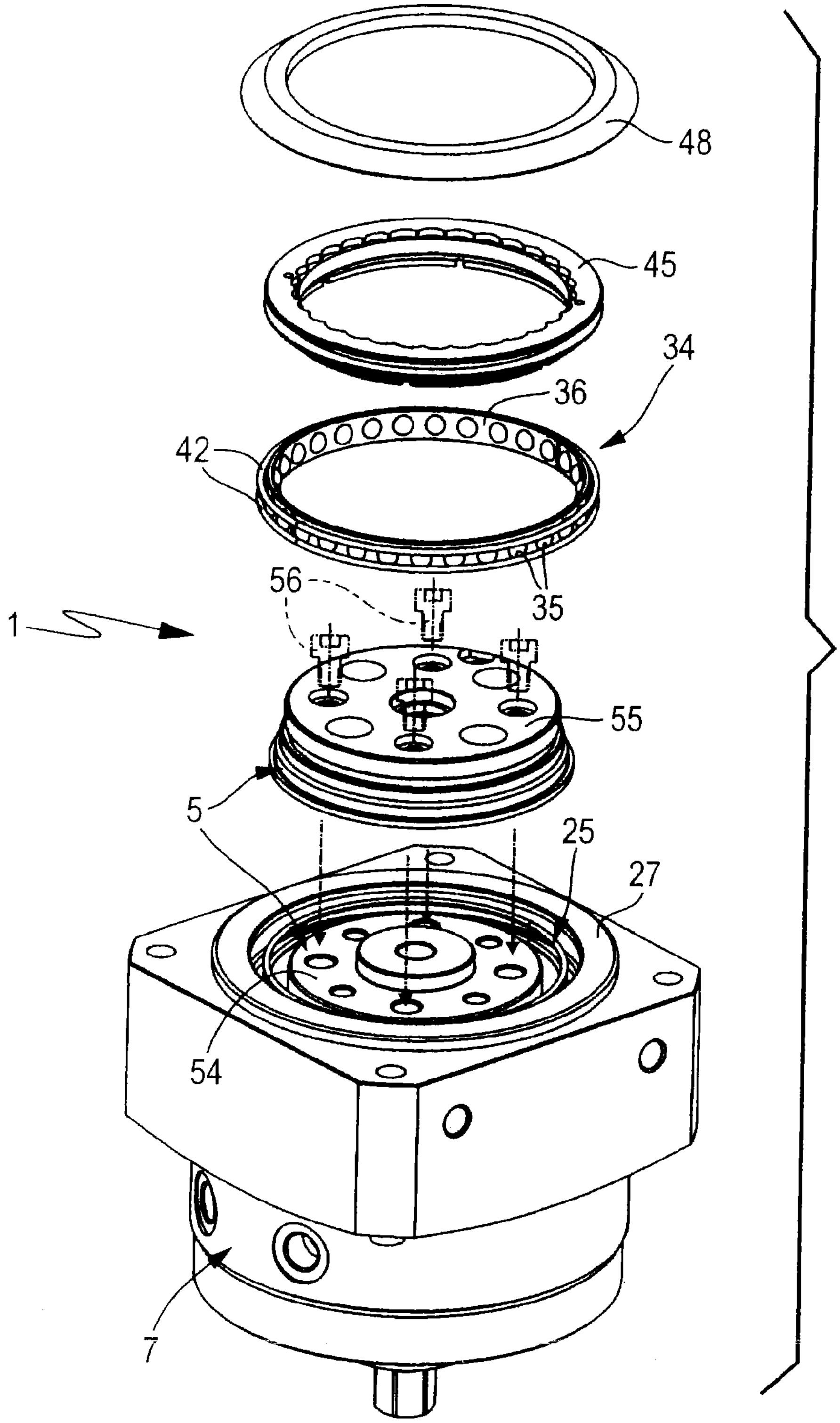
FIG. 4 is a view in perspective, partly in the form of an exploded view, of the rotary drive device of FIGS. 1 through 3.

The bearing portion 55 is embodied for instance in cup-shaped fashion, so that it fits from the front over the flange portion 54 in hoodlike fashion, as can readily be seen from FIG. 3. The adjusting ring 45 here is expediently mounted on the bearing portion 55, so that the above explanations with regard to the bracing of the inner running surface arrangement 37 apply to the bearing portion 55 as well.

The bearing portion 55, in particular placed coaxially onto the flange portion 54, can for instance be fixed detachably to the flange portion 54 by means of a plurality of fastening screws 56.

The adjusting ring 45 is expediently for the most part placed axially in front of the device housing 7. Only that portion of the adjusting ring 45 on which the front inner bearing ring 43*b* is supported plunges into the bearing receptacle 25, in order to ensure that the bearing assembly 34 is received entirely inside the bearing receptacle 25.

The invention claimed is:

1. A rotary drive device, having a device housing in which drive means are disposed which are in rotary driving connection with a power takeoff part supported rotatably relative to the device housing, the power takeoff part having a power takeoff disc which over at least a portion of its axial length is disposed in a bearing receptacle surrounded radially outward by the device housing, and the power takeoff disc being surrounded concentrically radially outward by at least one annular roller bearing unit which has a bearing assembly, the bearing assembly comprising the following: a plurality of rolling elements distributed over the circumference of the power takeoff disc; an annular inner running surface arrangement serving to radially brace the rolling elements relative to the power takeoff disc; and an annular outer running surface arrangement serving to radially brace the rolling elements with respect to the device housing, wherein the entire bearing assembly is received axially inside the bearing receptacle of the device housing, in such a manner that the entire outer running surface arrangement is surrounded and braced by a boundary wall portion of the device housing, the boundary wall portion delimiting the bearing receptacle radially outward wherein the inner running surface arrangement comprises a front inner bearing ring axially spaced-apart from a rear inner bearing ring, the rear inner bearing ring being associated with the bottom of the bearing receptacle and being braced directly on the power takeoff disc, and the front inner bearing ring being braced directly on an adjusting ring screwed coaxially on the power takeoff disc, and wherein the power takeoff part has a power takeoff shaft extending centrally from the power takeoff disc into the interior of the device housing, the power takeoff shaft being in rotary driving connection with the drive means.

2. The rotary drive device as defined by claim 1, wherein the outer running surface arrangement is embodied on at least one wirelike outer bearing ring, which is braced on the boundary wall portion of the device housing.

3. The rotary drive device as defined by claim 2, wherein the radial interface of the boundary wall portion has an annular groove, concentric with the power takeoff disc, in which annular groove the at least one outer bearing ring is received.

4. The rotary drive device as defined in claim 2, wherein two axially spaced-apart wirelike outerbearing rings are provided, each of said rings being braced on the boundary wall portion of the device housing.

5. The rotary drive device as defined by claim 1, wherein the adjusting ring, for adjusting the internal pre-stressing of the bearing assembly, is placed axially adjustably on the power takeoff disc.

6. The rotary drive device as defined by claim 1, wherein the adjusting ring has a radially outward-protruding annular sealing lip, which rests with sealing contact on an end face of the boundary wall portion.

7. The rotary drive device as defined by claim 1, wherein the bearing assembly has an annular bearing cage in the form of a multiply perforated, annularly curved strip element, which fixes the rolling elements relative to one another.

8. The rotary drive device as defined by claim 1, wherein the device housing has a housing wall, which defines at least one drive chamber that at least partly receives the drive means.

9. The rotary drive device as defined by claim 8, wherein the boundary wall portion is a component made in one piece with the housing wall of the device housing.

10. The rotary drive device as defined by claim 8, wherein the housing wall has at least a first wall element and a second wall element disposed in succession in the axial direction of the rotary axis of the power takeoff part, which wall elements delimit the at least one drive chamber, and the boundary wall portion is a component made in one piece with the first wall element.

11. The rotary drive device as defined by claim 8, wherein the drive means have at least one pivoting piston, which is disposed in the at least one drive chamber and can be driven by fluid to execute a reciprocating pivoting motion, and which is in rotary driving connection with the power takeoff part.

12. The rotary drive device as defined by claim 1, wherein the drive means are embodied for actuation brought about by fluid force.

13. A rotary drive device comprising:

a device housing defining a bearing receptacle and a drive chamber, the bearing receptacle being delimited at a radially outward extent by a boundary wall portion of the device housing;

a power takeoff part rotatably supported by the device housing, the power takeoff part including a power takeoff disc disposed at least partially in and radially surrounded by the housing bearing receptacle, the power takeoff disc having an interface surface for fastening a component to the power takeoff part and a threaded outer circumferential surface;

a drive means disposed in the housing drive chamber, the drive means being in rotary driving connection with the power takeoff part for rotating the power takeoff part;

an adjusting ring coaxially disposed on the power takeoff disc of the power takeoff part, the adjusting ring having a threaded inner surface engaged with the threaded outer circumferential surface of the power takeoff disc of the power takeoff part whereby the relative axial position of the adjusting ring with respect to the power takeoff disc can be adjusted by rotating the adjusting ring; and an annular roller bearing unit concentrically surrounding the power takeoff disc of the power takeoff part in a radially outward direction, the annular roller bearing unit including a bearing assembly received axially inside the bearing receptacle of the device housing, the bearing assembly comprising:

a plurality of rolling elements distributed over the circumference of the power takeoff disc;

a front outer bearing ring;

a rear outer bearing ring axially spaced apart from the front outer bearing ring, the front and rear outer bearing rings radially bracing the rolling elements with respect to the device housing and being surrounded and braced by the boundary wall portion of the device housing bearing receptacle;

a front inner bearing ring braced directly on the adjusting ring; and a rear inner bearing ring axially spaced apart from the front inner bearing ring and being braced directly on the power takeoff disc, the front and rear inner bearing rings radially bracing the rolling elements relative to the power takeoff disc, wherein an internal pre-stressing of the bearing assembly can be adjusted by axially adjusting the adjusting ring on the power takeoff disc.

14. The rotary drive device as defined by claim 13, wherein the power takeoff part has a power takeoff shaft, supporting the power takeoff disc, which shaft, in the interior of the device housing, is in rotary driving connection with the drive means.

15. The rotary drive device as defined by claim 14, wherein the power takeoff disc is braced radially and axially by the roller bearing unit, and the power takeoff shaft is braced solely in the radial direction relative to the device housing in a region spaced axially apart from the roller bearing unit.

16. The rotary drive device as defined by claim 14, wherein the power takeoff disc is embodied in two parts, comprising an annular flange portion, embodied in one piece with the power takeoff shaft, and a bearing portion, connected to the flange portion in a manner fixed against relative rotation by a screw connection, which bearing portion is placed coaxially on the flange portion and on which the inner running surface arrangement of the bearing assembly is braced.

17. The rotary drive device as defined by claim 16, wherein the bearing portion is cup-shaped and fits over the flange portion.

* * * * *

UNITED STATES PATENT AND TRADEMARK OFFICE

CERTIFICATE OF CORRECTION

PATENT NO. : 8,443,684 B2
APPLICATION NO. : 12/989990
DATED : May 21, 2013
INVENTOR(S) : Thorwart et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 230 days.

Signed and Sealed this
Eighth Day of September, 2015

Michelle K. Lee
*Director of the United States Patent and Trademark Office*